United States Patent [19]
Ficken et al.

[11] Patent Number: 4,492,902
[45] Date of Patent: Jan. 8, 1985

[54] PERMANENT MAGNETIC MOTOR COMMON LEG IMPEDANCE COMPENSATION MEANS

[75] Inventors: William Ficken, Berkeley Heights; Jerome Sears, Wyckoff; Walter Parfomak, Wallington, all of N.J.

[73] Assignee: Allied Corporation, Morris Township, Morris County, N.J.

[21] Appl. No.: 597,036

[22] Filed: Apr. 5, 1984

Related U.S. Application Data

[63] Continuation-in-part of Ser. No. 500,739, Jun. 3, 1983.

[51] Int. Cl.³ .............................................. H02K 23/00
[52] U.S. Cl. .................................. 318/254; 318/138; 318/331; 318/439
[58] Field of Search ............... 318/718, 738, 747, 748, 318/778, 779, 780, 797, 798, 799, 331, 138, 254, 439

[56] References Cited

U.S. PATENT DOCUMENTS

| | | | |
|---|---|---|---|
| 3,584,274 | 6/1971 | Dimitrios et al. | 318/138 |
| 3,611,081 | 10/1971 | Watson | 318/254 X |
| 3,750,000 | 7/1973 | Bruckner et al. | 318/138 X |
| 3,794,895 | 2/1974 | Coupin et al. | 318/254 |
| 3,911,338 | 10/1975 | Igarashi et al. | 318/254 X |

*Primary Examiner*—Ulysses Weldon
*Attorney, Agent, or Firm*—Anthony F. Cuoco

[57] ABSTRACT

A motor for an inertial sensing instrument includes a permanent magnet rotor and a stator having a driving winding inductively coupled to a sensing winding, with both windings connected to a common impedance. A feedback arrangement is provided which compensates for noise inducted by the common impedance in a sensing signal provided by the sensing winding.

5 Claims, 1 Drawing Figure

U.S. Patent  Jan. 8, 1985  4,492,902
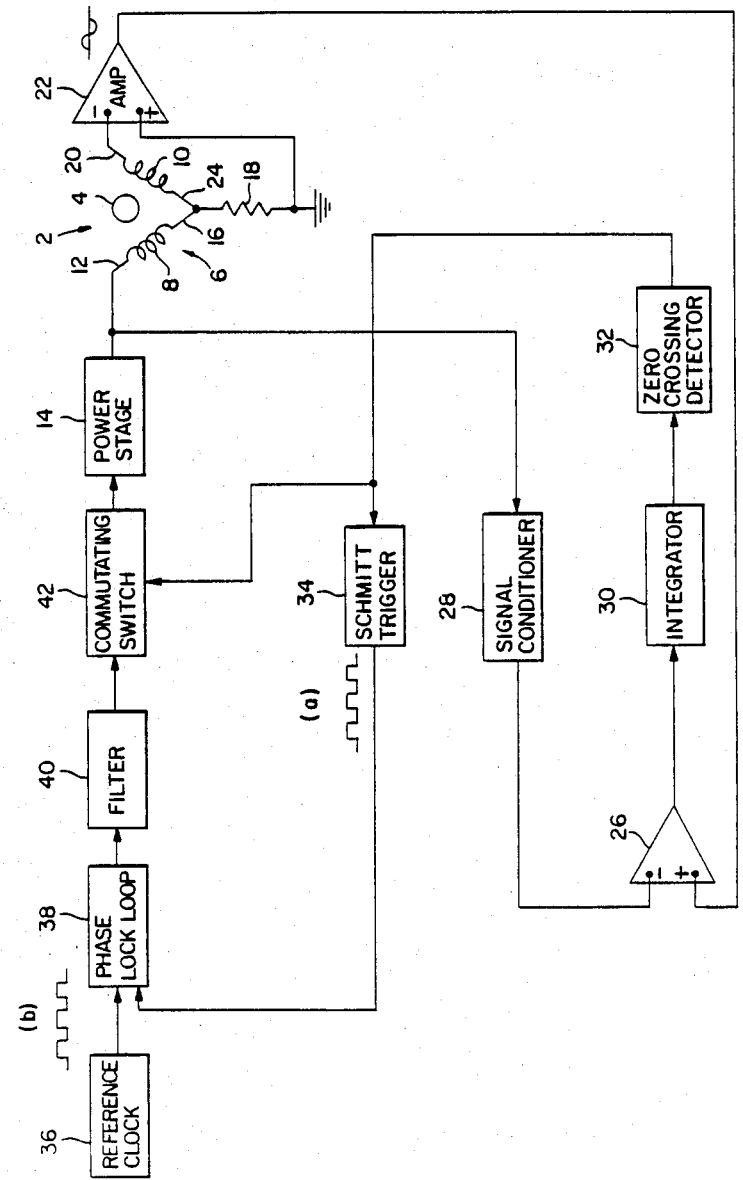

PERMANENT MAGNETIC MOTOR COMMON LEG IMPEDANCE COMPENSATION MEANS

BACKGROUND OF THE INVENTION

This application is a continuation in part of pending U.S. application Ser. No. 500,739, filed on June 3, 1983.

Permanent magnet motors are used to drive inertial sensing instruments. The drive motors include a two-phase stator, a permanent rotor, and a suitable drive stage to initialize, start, run up and maintain synchronous operation. The initialization and starting is achieved via two-phase operation. Thereafter at a suitable frequency, typically five to ten percent of synchronous frequency, the winding of one stator phase (the sensing winding) provides a signal indicative of rotor position and speed, and the winding of the other stator phase (the driving winding) is energized by the signal after it has been processed by the drive stage. Upon achieving synchronous speed, the amplitude of the signal from the driving winding (the driving signal) is reduced by an appropriate feedback signal to the minimum required to overcome friction and windage and to thereby optimize the efficiency and power requirement of the inertial sensing instrument.

A common leg impedance (resistance) couples the driving signal and the signal from the sensing winding (the sensing signal), thereby introducing a significant level of undesired cross-coupling voltage from the driving stage into the sensing signal. This phenomenon induces false zero cross-over and thereby seriously affects the commutation timing of the motor. It follows that this condition is particularly aggravated during motor start-up and pre-synchronous modes of operation when the driving signal is at its maximum and the feedback signal is relatively weak. This could result in a highly undesirable no-start condition.

Prior to the present invention this condition has been accommodated by providing a fourth wire for isolating the sensing and driving windings, or by minimizing the length while maximizing the cross section of all wires. Both situations will be recognized as being disadvantageous. The addition of a fourth wire is particularly disadvantageous in that each additional wire implies adding to the inertial sensing instrument an additional flex lead, slip ring connector pin, harness wire, etc., which, as will be understood, can be impractical in the design of inertial sensing instruments.

The present invention compensates for the aforenoted common leg impedance induced noise through an appropriate feedback arrangement.

SUMMARY OF THE INVENTION

This invention contemplates compensation means for common leg impedance in a permanent magnet motor, wherein a signal from the motor power stage, which is a function of the common leg current, is conditioned and summed with the back EMF from the sensing winding of the motor stator. The summed signal is modified to generate pulses which are compared to the pulses of a reference signal in a phase lock loop. The phase lock loop provides a signal which is filtered and applied to a commutating switch which drives the motor power stage.

BRIEF DESCRIPTION OF THE DRAWING

The single FIGURE in the drawing is a block diagram-electrical schematic illustrating the invention.

DETAILED DESCRIPTION OF THE INVENTION

A motor for an inertial sensing instrument is designated generally by the numeral 2 and includes a permanent magnet rotor 4 and a two-phase stator designated generally by the numeral 6. One phase of stator 6 includes a winding 8 (the driving winding) and the other phase of the stator includes winding 10 (the sensing winding) magnetically coupled to driving winding 8. Driving winding 8 provides a driving signal and sensing winding 10 provides a signal (sensing signal) indicative of the position and speed of rotor 4.

Driving winding 8 has one leg 12 connected to a power stage 14, which includes a conventional push-pull amplifier, and another leg 16 connected to undesired ground impedance indicated by a resistor 18. Sensing winding 10 has one leg 20 connected to the inverting input terminal (−) of a buffer amplifier 22 and another leg 24 connected to resistor 18. The non-inverting input terminal (+) of buffer amplifier 22 is connected to ground.

Amplifier 22 provides a sinusoidal output which is applied to the non-inverting input terminal (+) of a summing amplifier 26. The output of power stage 14 is applied to a signal conditioner 28 which phase shifts and scales the power stage output. The output of signal conditioner 28 is applied to the inverting input terminal (−) of summing amplifier 26.

The output of summing amplifier 26 is applied to a phase shifting integrator 30 and therefrom to a zero crossing detector 32. The output of zero crossing detector 32 is applied to a Schmidt trigger 34 for providing rectangular pulses as shown in the FIGURE and designated as (a).

A reference clock designated by the numeral 36 provides rectangular pulses designated in the FIGURE as (b).

The phase of pulses (a) is different than the phase of pulses (b), and hence pulses (a) and pulses (b) are applied to a conventional phase lock loop 38, whereby the phase of pulses (a) are caused to follow exactly the phase of pulses (b).

The output of phase lock loop 38 is applied to a filter 40, which may be a conventional lag/lead filter, and therefrom to a commutating switch 42, which is actuated by the output of zero crossing detector 32 to impart appropriate frequency and time characteristics to the commutating switch. The commutated output from commutating switch 42 is applied to power stage 14.

It will now be recognized that a portion of the driving signal from stator winding 8 appears across resistor 18 and becomes part of the sensing signal from stator winding 10. Significant noise is thereby induced into the sensing signal which is disadvantageous for the aforenoted reasons. The present invention compensates for this induced noise by an appropriate feedback loop. That is to say, the output signal from power stage 14 is applied through a feedback loop including signal conditioner 28 and summing amplifier 26, whereat the conditioned output from power stage 14 is summed differentially with the back EMF of the sensing signal from sensing winding 10. This eliminates the induced noise without isolating driving winding 8 from sensing winding 10 by virtue of a fourth wire as is heretofore been necessary.

What is claimed is:

1. A permanent magnet motor for a sensing device, characterized by:
    a permanent magnet rotor;
    a two-phase stator including a driving winding for providing a driving signal having a first phase and a sensing winding magnetically coupled to the driving winding for providing a sensing signal having a second phase;
    an undesired common impedance connected to the driving winding and to the sensing winding;
    power means for providing a power signal, and connected to the driving winding for applying said power signal thereto, with a portion of the driving signal appearing across the undesired common impedance and becoming a part of the sensing signal;
    means connected to the sensing winding and to the undesired common impedance for combining the sensing signal and the signal across the common impedance;
    means connected to the power means and to the combining means for feeding back the combined signal to the power means to compensate for that portion of the driving signal appearing across the undesired common impedance and which becomes a part of the sensing signal; and
    the power means being responsive to the combined signal fed back thereto for providing the power signal.

2. A permanent magnet motor for a sensing device as described by claim 1, further characterized by:
    the driving winding having first and second legs;
    the common impedance having first and second legs;
    the power means connected to one of the first and second legs of the driving winding, with the other of said legs of the driving winding connected to one of the first and second legs of the common impedance; and
    the other of said legs of the common impedance connected to ground.

3. A permanent magnet motor for a sensing device as described by claim 1, further characterized by:
    the sensing winding having first and second legs;
    one of the first and second legs of the sensing winding connected to the combining means, with the other of said legs of the sensing winding connected to the other leg of the common impedance.

4. A permanent magnet rotor for a sensing device as described by claim 1, wherein the means connected to the power means and to the combining means for feeding back the combined signal to the power means is characterized by:
    means connected to the power means for conditioning the power signal therefrom;
    the means connected to the sensing winding and to the undesired common impedance for combining the sensing signal and the signal across the common impedance including means responsive to the sensing signal and to the signal across the impedance for providing a buffered signal representing the back EMF of the sensing winding;
    means connected to the power signal conditioning means and to the buffered signal means for differentially summing the signals therefrom and for providing a differentially summed signal;
    means for phase shifting and integrating the differentially summed signal;
    means for detecting the zero crossing of the phase shifted and integrated signal;
    first means connected to the zero crossing detecting means for providing a rectangular pulse output of a first predetermined phase;
    second means for providing a reference rectangular pulse output of a second predetermined phase;
    means for locking the phase of the pulse output from the first neans to the phase of the pulse output from the second means, and for providing a phase locked pulse output;
    means for filtering the phase locked pulse output;
    means for commutating the filtered, phase locked pulse output; and
    the power means connected to the commutating means and responsive to the commutated, filtered, phase locked pulse output for providing the power signal.

5. A permanent magnet motor for a sensing device as described by claim 4 characterized by:
    the commutating means connected to the zero crossing detecting means for imparting frequency and time characteristics to the commutating means.

* * * * *